(12) United States Patent
McCarty et al.

(10) Patent No.: US 9,053,824 B2
(45) Date of Patent: Jun. 9, 2015

(54) NUCLEAR CONTROL ROD WITH FLEXURE JOINT

(75) Inventors: Jeffrey M. McCarty, Cayce, SC (US); Leo J. Fanning, Columbia, SC (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 409 days.

(21) Appl. No.: 13/490,494

(22) Filed: Jun. 7, 2012

(65) Prior Publication Data

US 2013/0329847 A1    Dec. 12, 2013

(51) Int. Cl.
*G21C 7/06* (2006.01)
*G21C 7/117* (2006.01)
*G21C 21/18* (2006.01)

(52) U.S. Cl.
CPC .......... *G21C 7/117* (2013.01); *Y02E 30/39* (2013.01); *G21C 21/18* (2013.01)

(58) Field of Classification Search
None
See application file for complete search history.

(56) References Cited

U.S. PATENT DOCUMENTS

| 2,879,651 | A | * | 3/1959 | Leto et al. ................. 464/139 |
|---|---|---|---|---|
| 3,715,269 | A | * | 2/1973 | Mehren ...................... 376/233 |
| 3,967,741 | A | * | 7/1976 | Hoffmeister ................. 376/262 |
| 4,105,887 | A | * | 8/1978 | Marshall et al. ............. 219/72 |
| 4,326,919 | A |   | 4/1982 | Hill |
| 4,855,100 | A |   | 8/1989 | Shallenberger et al. |
| 4,888,151 | A | * | 12/1989 | Gjertsen et al. ............. 376/327 |
| 5,075,072 | A | * | 12/1991 | Vollman ....................... 376/335 |
| 5,141,711 | A | * | 8/1992 | Gjertsen et al. ............. 376/327 |
| 5,669,729 | A | * | 9/1997 | Attix ............................ 403/282 |
| 5,889,832 | A |   | 3/1999 | Bonnamour et al. |
| 7,526,058 | B2 | * | 4/2009 | Fawcett et al. ............... 376/426 |
| 2008/0253496 | A1 | * | 10/2008 | McCarty et al. ............. 376/327 |

OTHER PUBLICATIONS

International Search Report for PCT/US2013/042958 dated Oct. 8, 2013 (Form PCT/ISA/210).
Written Opinion of the International Searching Authority for PCT/US2013/042958 dated Oct. 8, 2013 (Form PCT/ISA/237).
International Preliminary Report on Patentability for PCT/US2013/042958 dated Dec. 18, 2014 (Forms PCT/IB/326, PCT/IB/373, PCT/ISA/237).

* cited by examiner

*Primary Examiner* — Jack W Keith
*Assistant Examiner* — Julia Prendenrgast
(74) *Attorney, Agent, or Firm* — Joseph C. Spadacene; Westinghouse Electric Company LLC

(57) ABSTRACT

A rod cluster control assembly having a control rod upper end plug formed in two parts and connected together with a flexible joint coupling located at or below a connecting finger on a spider vane. The upper portion of the upper control rod end plug is screwed into the connecting finger on the spider vane and lock welded between a lower portion of the finger and a shoulder on an abutting ledge of the upper portion of the end plug.

9 Claims, 5 Drawing Sheets

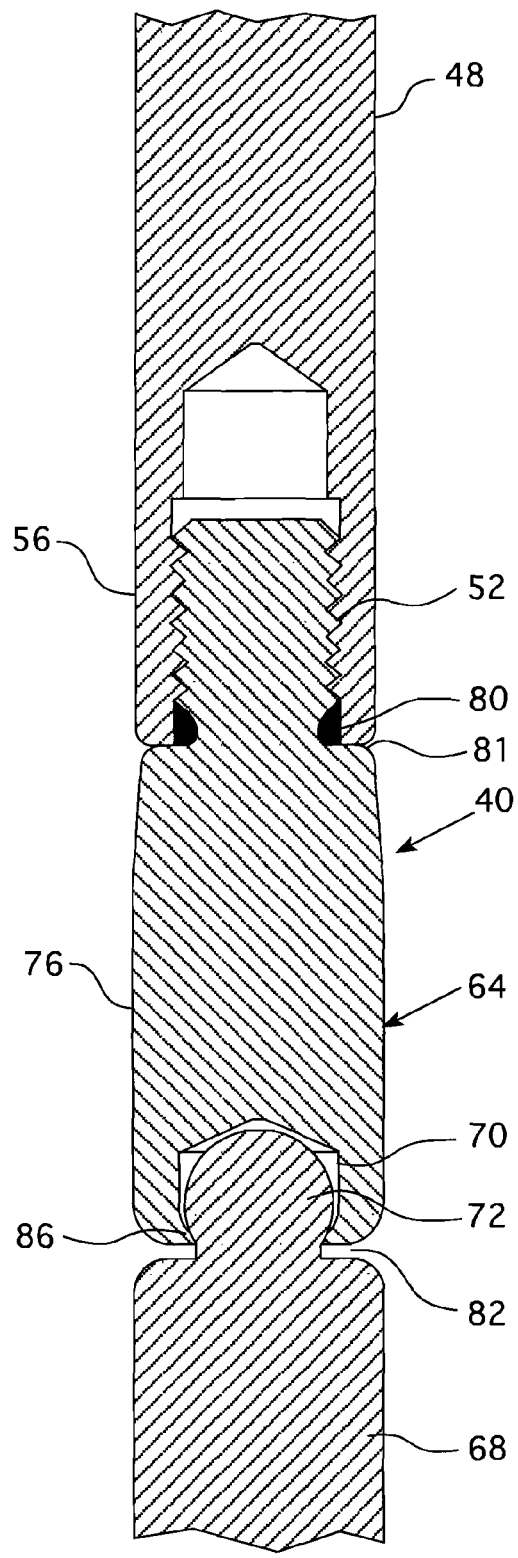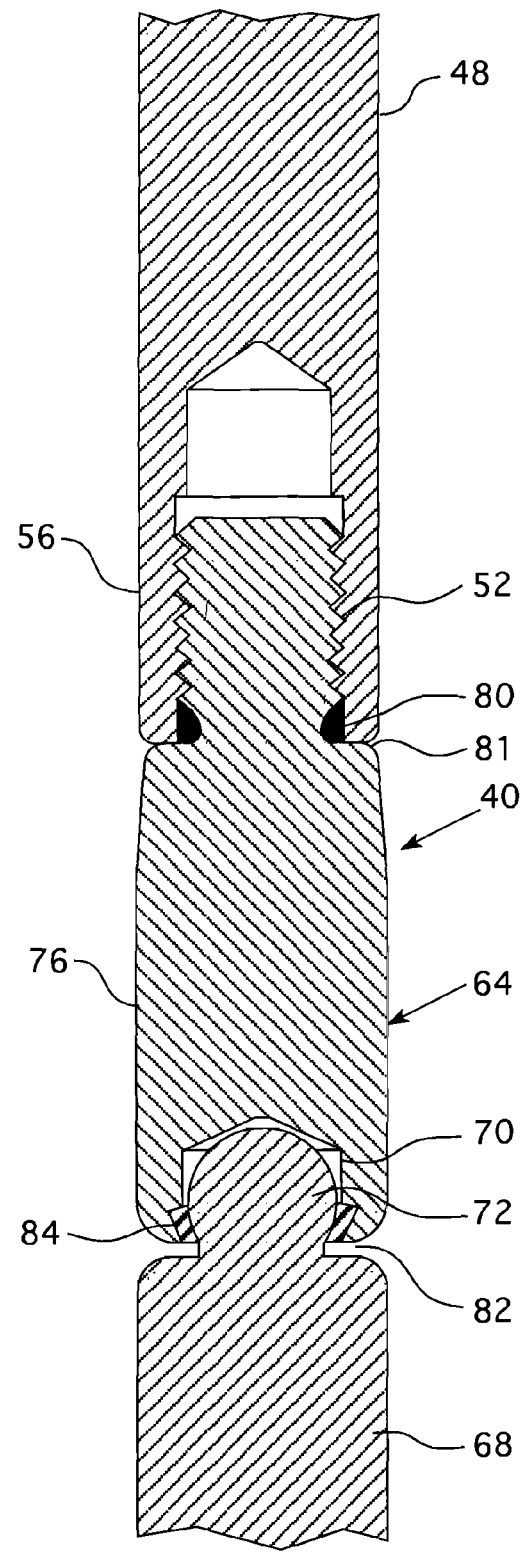

NUCLEAR CONTROL ROD WITH FLEXURE JOINT

BACKGROUND

1. Field

The present invention relates generally to control rod assemblies for nuclear reactors and, more particularly, is concerned with a flexible joint between a drive rod assembly and a control rod.

2. Related Art

In a typical nuclear reactor, such as a pressurized water reactor, the reactor core includes a large number of fuel assemblies, each of which is composed of top and bottom nozzles with a plurality of elongated, transversely spaced guide thimbles extending longitudinally between the nozzles and a plurality of transverse support grids axially spaced along and attached to the guide thimbles. In addition, each fuel assembly is composed of a plurality of elongated fuel elements or rods transversely spaced apart from one another and from the guide thimbles and supported by the transverse grids between the top and bottom nozzles. The fuel rods each contain fissile material and are grouped together in an array which is organized so as to provide a neutron flux in the core sufficient to support a high rate of nuclear fission, and thus the release of a large amount of energy in the form of heat. A liquid coolant is pumped upwardly through the core in order to extract some of the heat generated in the core for the production of useful work.

Since the rate of heat generation in the reactor core is proportional to the nuclear fission rate, and this, in turn, is determined by the neutron flux in the core, control of heat generation at reactor start-up, during operation, and at shutdown is achieved by varying the neutron flux. Generally, this is done by absorbing excess neutrons using control rods which contain neutron absorbing material. The guide thimbles, in addition to being structural elements of the fuel assembly, also provide channels for insertion of neutron absorber control rods within the core. The level of neutron flux, and thus the heat output of the core, is normally regulated by the movement of the control rods into and out of the guide thimbles.

One common arrangement utilizing control rods in association with the fuel assembly can be seen in U.S. Pat. No. 4,326,919 to Hill. This patent shows a control rod spider assembly which includes a plurality of control rods and a spider structure supporting the control rods at their upper ends. The spider structure, in turn, is connected to a control rod drive mechanism that vertically raises and lowers (referred to as a stepping action) the control rods into and out of the hollow guide thimbles of the fuel assembly. The typical construction of a control rod used in such an arrangement is in the form of an elongated metallic cladding tube having a neutron absorbing material disposed within the tube and end plugs at opposite ends thereof for sealing the absorber material within the tube.

The spider structure typically includes a plurality of radially extending vanes supported on and circumferentially spaced about a central hub. The vanes are flat metal plates positioned on edge and connected at their inner most ends to the central hub. Cylindrically shaped control rod connecting fingers are mounted to and are supported by the vanes with some of the vanes having only a single connecting fingers and other vanes having a spaced pair of connecting fingers associated therewith.

Typically, the upper end plug of each control rod has a threaded outer end which is received within a bore in the lower portion of a connecting finger of the spider structure and threadable into a tapped hole formed in the finger at the inner end of the bore. The control rod end plug is then secured or locked within the bore of the connecting finger by a key or pin inserted into the side of the finger and the end plug and the pin is then welded therein, as more particularly described in U.S. Pat. No. 4,855,100.

The current rod cluster control assembly control rods incorporate a reduced diameter section at the connection with the finger, which forms a flexure joint. The joint allows the control rod to deflect laterally to compensate for small misalignment between the control rod and the fuel assembly guide thimble or other reactor components, to minimize interference. This helps to prevent hang-up and reduces wear between the components. It also prevents bending loads induced by lateral deflection of the control rods from overloading the screw threads which attach the control rod upper end plug to the connecting finger. However, there are several limitations to the current flexure joint design. For example, lateral deflection with the current design must be limited by the spider finger instead of by the interfacing components to prevent overload of the joint. In addition, the spider finger hole diameter must be large enough to clear a shoulder on the control rod upper end plug, adjacent to the screw threads, that allows for preloading of the threaded joint and a reaction to lateral bending loads. The required diameter of the finger hole means that the wall thickness of the interfacing end of the finger is very small, which adversely impacts the spider assembly manufacturing process. Further, to ensure that the control rod is locked into position within the finger and cannot unscrew, the current rods use the small pin welded into a tightly toleranced hole drilled after the rods are installed into the spider finger. If the hole is drilled too deeply then the pin does not engage the spider finger and the rod can rotate and become disengaged from the assembly. In the past, this has resulted in a few dropped rods. Further, because the hole must be drilled after the rods are installed into the spider assembly, this operation slows the manufacturing process.

Accordingly, a new control rod/spider interface is desired that provides increased lateral deflection that is only limited by the interfacing components, e.g., a control rod guide thimble or other core internal components, instead of the spider finger.

Additionally, such an interface is desired that has the threaded joint preloaded from the bottom of the finger that enables fingers with thicker walls to improve the efficiency of the manufacturing process.

Additionally, such an interface is desired that has a weld at the bottom of the spider finger to lock the control rod in position, without having to drill holes for a pin.

SUMMARY

These and other objects are achieved by a nuclear control rod assembly having a drive shaft for moving the control rod assembly relative to a core of the nuclear reactor and a control rod element connected to the drive shaft and insertable into the core of the nuclear reactor under the motive power of the drive shaft. A transition assembly connects the drive shaft to the control rod element through a finger attachment wherein the connection between the finger attachment and the control rod element is through a flexible joint coupling such as a ball and socket coupling located at or below the finger attachment and configured to enable lateral movement of the control rod element below the finger attachment.

In one embodiment, a bottom of the finger attachment is welded to an upper portion of the transition assembly. Preferably, the control rod element has an upper end plug connected to an upper end of a tubular section housing an active ingredient for interacting with fission products within the core and an upper end plug extension which is connected to the finger attachment at one end and to the upper end plug at another end with the ball and socket coupling. In one embodiment, the ball is captured within the socket with a retaining ring. In another embodiment, the ball is captured within the socket with a weld. In still a third embodiment, the lower portion of the socket is crimped to capture the ball. Desirably, the upper end plug extension has a male thread on an upper portion of an outer surface that mates with a female thread within the finger attachment. Preferably, the upper end plug extension has an enlarged shoulder below the male thread that abuts a lower end of the finger attachment. In one embodiment the enlarged shoulder is welded to the lower end of the finger attachment. Generally, the nuclear reactor includes one or more components that interface with the control rod element and in accordance herewith, the lateral movement of the control rod element is limited only by the interfacing component.

BRIEF DESCRIPTION OF THE DRAWINGS

A further understanding of the invention can be gained from the following description of the preferred embodiments when read in conjunction with the accompanying drawings in which:

FIG. 6 is sectional view of the ball and socket coupling of a spider vane finger to a control rod in accordance with a second embodiment described herein; and FIG. 7 is a sectional view of the coupling between a spider vane finger and a control rod in accordance with a third embodiment described herein.

DESCRIPTION OF THE PREFERRED EMBODIMENT

Figure 1:
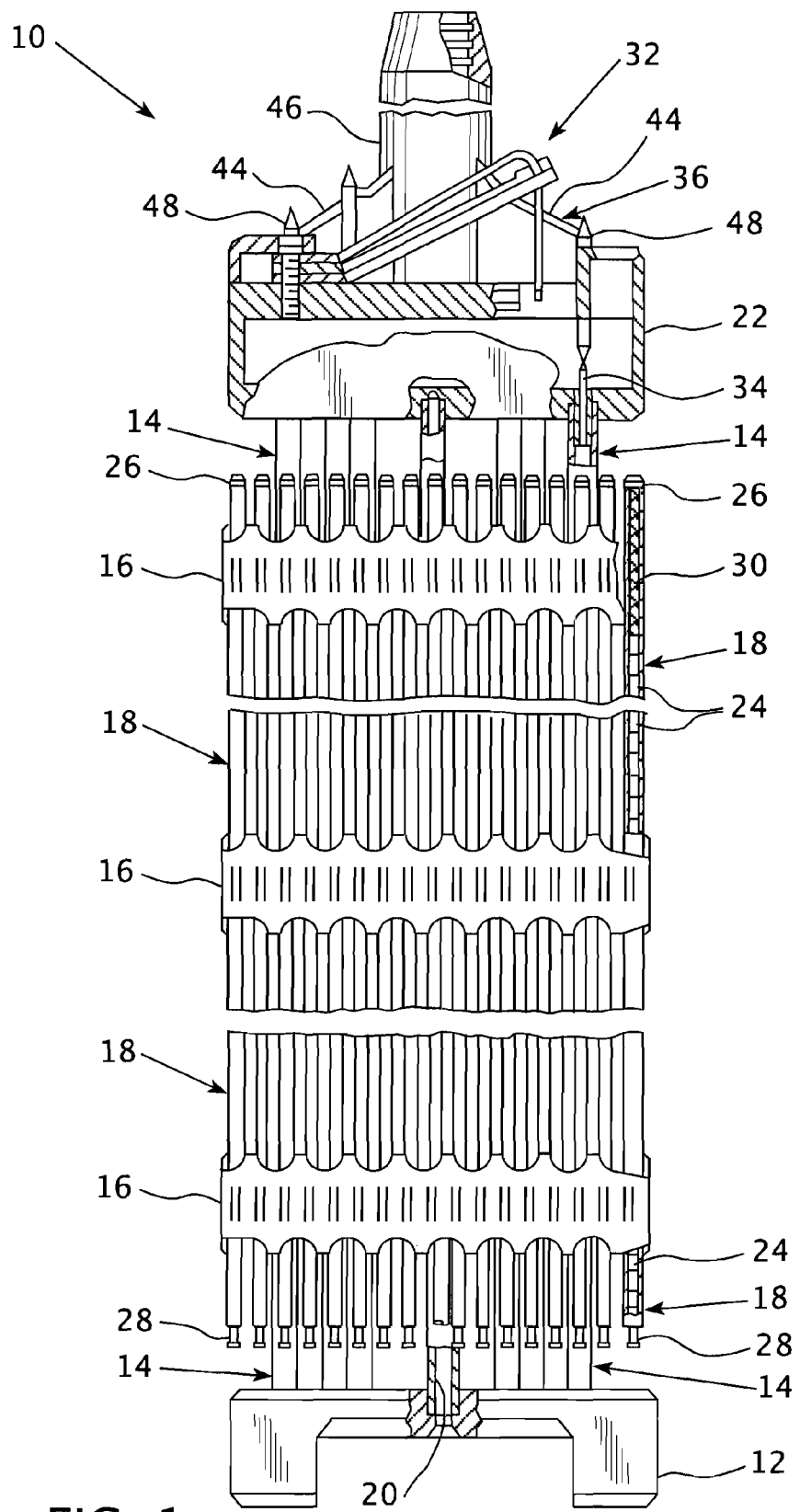
FIG. 1 is an elevational view of fuel assembly, illustrated in vertically shortened form, with parts partially sectioned and broken away for purposes of clarity, having a control rod spider assembly, disposed above the fuel assembly, schematically showing the ball and socket coupling between a spider finger and a control element in accordance with one embodiment described herein.

Referring now to the drawings and particularly to FIG. 1, there is shown an elevational view of a nuclear reactor fuel assembly, represented in vertically shortened form and being generally designated by the reference numeral 10. The fuel assembly illustrated in FIG. 1 is of the type used in a pressurized water reactor, and basically includes a lower end structure or bottom nozzle 12 for supporting the assembly on the lower core plate (not shown) in the core region of a reactor (not shown), and a number of longitudinally extending guide tubes or thimbles 14 which project upwardly from the bottom nozzle 12. The assembly 10 further includes a plurality of transverse grids 16 axially spaced along the guide thimbles 14 and an organized array of elongated fuel rods 18 transversely spaced and supported by the grids 16. Also, the assembly 10 has an instrumentation tube 20 located in the center thereof and an upper end structure or top nozzle 22 removably attached to the upper ends of the guide thimbles 14 to form an integral assembly capable of being conventionally handled without damaging the assembly of parts.

The fuel rods 18 in the array thereof in the assembly 10 are held in spaced relationship with one another by the grids 16 spaced along the fuel assembly length. Each fuel rod 18 includes nuclear fuel pellets 24 and the opposite ends of the fuel rods are closed by upper and lower end plugs 26, 28 to hermetically seal the rods. Commonly, a plenum spring 30 is disposed between the upper end plug 26 and the pellets 24 to maintain the pellets in a tight, stacked relationship within the rods 18. The fuel pellets 24, composed of fissile material, are responsible for creating the reactive power of the nuclear reactor. Control rods 34 move within the guide thimbles 14 under the control of a spider structure 36 that is connected to a plurality of the control rods so that the control rods within a fuel assembly 10 move in unison. Insertion of the control rods controls the nuclear reaction by the absorption of neutrons, which, when absorbed, are not available to promote the fissile reaction. A liquid moderator/coolant such as water, or water containing boron, is pumped upwardly through the fuel assemblies of the core in order to extract heat generated therein for the production of useful work.

Figure 2:
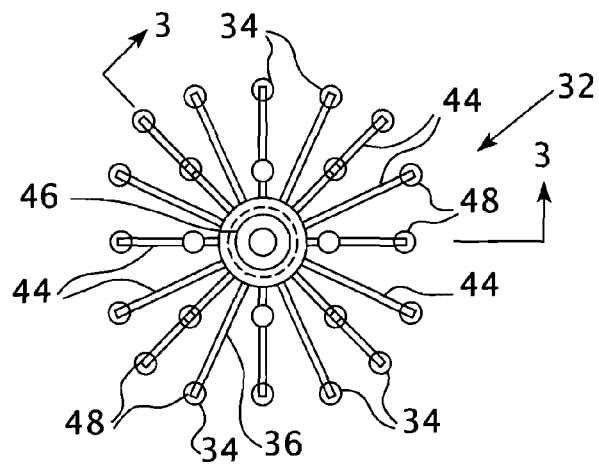
FIG. 2 is a plan view of a control rod spider assembly of the prior art of the type illustrated in FIG. 1.
Figure 3:
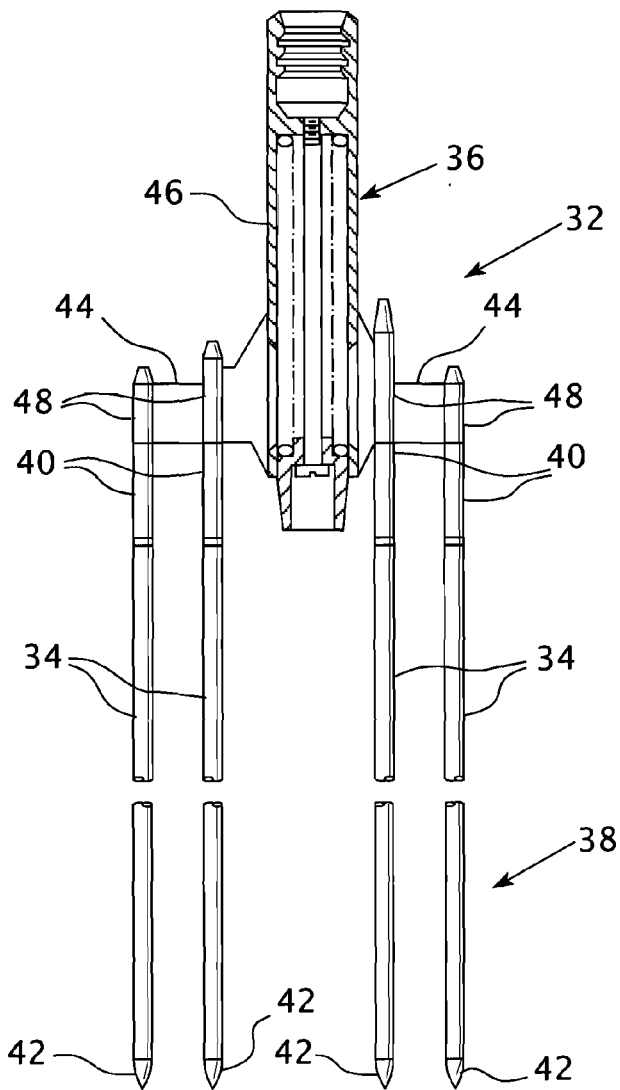
FIG. 3 is an elevational view, with parts partially sectioned, of the control assembly taken along the line 3-3 of FIG. 2.

FIGS. 2 and 3 provide a better view of a conventional control rod spider assembly of the type shown in FIG. 1 and generally designated by reference character 32. In its basic components, the control assembly 32 (also known as a rod cluster control assembly) includes a plurality of control rods 34 and a spider structure 36 which supports the control rods at their upper ends. The spider structure 36 holds the control rods 34 in a pattern matched to that of the guide thimbles 14 which adapts them to be inserted through the top nozzle 22 and downward through the guide thimbles 14 of the pressurized water reactor fuel assembly 10. The spider structure 36 is connected to a control mechanism (not shown) which is operable in a known manner to move the control rods 34 so as to regulate core power.

In a typical construction, each control rod 34 of the control assembly 32 is composed of an elongated metallic clad tube 38 having a neutron absorbing material disposed therein and upper and lower end plugs 40, 42 attached at opposite ends of the cladding tube 38 for sealing the absorber material therein. The spider structure 36 of the control assembly 32 typically includes a plurality of radially extending flukes or vanes 44 supported on and circumferentially spaced about a central hub 46. Cylindrical shaped control rod connecting fingers 48 are mounted to and supported by the vanes 44. Some of the vanes 44 have only a single connecting finger 48 attached thereon, whereas other vanes 44 have a spaced pair of connecting fingers 48 associated therewith.

Figure 4:
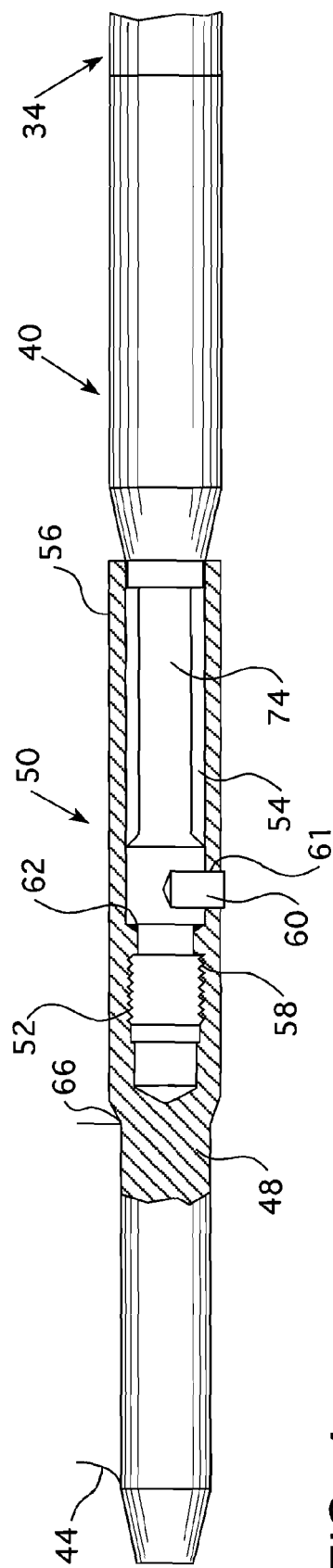
FIG. 4 is a sectional view of a prior art connection between a spider finger and a control rod end plug.

Referring to FIG. 4, there is illustrated one prior art attachment joint between a control rod 34 and a connecting finger 48 on the vane 44 of the control assembly spider structure 36. The connection is made at the upper end plug 40 of each control rod 34. It should be appreciated that like reference characters are employed to designate corresponding components among the several figures. Typically, the upper end plug 40 of each control rod 34 has a threaded outer end 52. Each connecting finger 48 is mounted to the vane 44 in a bayonet-type of welded connection, and has an axial bore 54 formed in a lower portion 56 thereof with a smaller diameter threaded hole 58 tapped therein at the inner end of the bore 54. The threaded outer end 52 of the upper end plug 40 is threadably received in the tapped hole 58 when the plug 40 is received within the axial bore 54. The end plug 40 is secured or locked therein by the key or pin 60 inserted so holes 61 which are drilled in the sides of the finger 48 and end plug 40, typically after the end plug is assembled within the bore 54, align. The pin 60 is then welded in place to secure the upper portion of the upper end plug 40 within the bore 54. Generally, the axial bore 54 terminates at the start of an upper portion 66 of each connecting finger 48 where the finger connects with the vane 44.

Current control rods incorporate a reduced diameter section 74, which forms a flexure joint. The flexure joint 74 allows the control rod to deflect laterally to compensate for small misalignments between the control rod and the fuel assembly or other reactor components to minimize interference. This helps to prevent hang-up and reduces wear between components. It also prevents bending loads induced by lateral deflections from overloading the screw threads 52, 58. There are several limitations with the current flexure joint 74 design. In the first instance, the lateral deflection of the control rod is limited by the spider finger instead of by the interfacing reactor internal components to prevent overload of the threaded joint 52, 58. In the second instance, the spider finger hole diameter must be large enough to clear a shoulder 62 adjacent to the screw threads 52, 58 that allows for preloading of the threaded joint and reaction to lateral bending loads. The required diameter of the finger bore 54 means that the wall thickness of the finger 48 is relatively small, which adversely impacts the spider manufacturing process. The wall thickness of the connecting finger is small so that preferably the finger outside diameter does not exceed the outside diameter of the control rod cladding.

As mentioned above, to ensure that the control rod is locked into position and cannot unscrew, the current control rod designs use a small pin 60 welded into a tightly toleranced hole drilled after the rods are installed into the spider finger 48. If the hole is drilled too deeply, then the pin does not engage the spider finger and the rods can rotate and become disengaged from the assembly, which has resulted in a number of instances of dropped rods. Because the holes must be drilled after the control rods are installed into the spider assembly, this process slows the manufacturing effort.

This invention employs a flexible joint coupling located approximately at or below the finger attachment. For example, a ball and socket flexure joint, such as that illustrated in FIGS. 5-7, may be preferably used to overcome the limitations of the current control rod design. However, other flexible joint configurations may also be used without departing from the spirit of this invention. The embodiments described herein provide for greater lateral deflection which is only limited by the interfacing core internal components instead of by the spider finger bore walls. The threaded joint described in this preferred, exemplary embodiment is preloaded below the finger, resulting in a much simpler assembly process with a thicker connecting finger bore wall that improves the spider manufacturing process. The control rod connection described herein can be locked within the finger without having to drill holes for a pin 60 as employed by the prior art.

Figure 5:
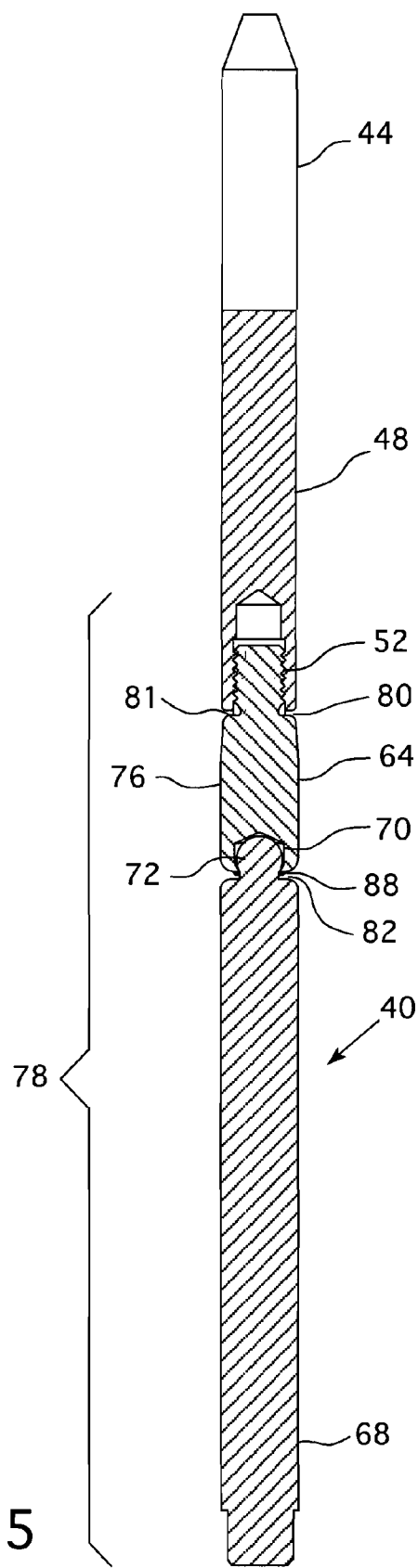
FIG. 5 is schematic sectional view of the ball and socket coupling of the control rod to a spider vane finger in accordance with one embodiment described herein.

The embodiments described herein and illustrated in FIGS. 5, 6 and 7 split the upper control rod end plug extension into two components, an upper portion 64 and a lower portion 68. The upper portion 64 has one end threaded at 52 so that it can be installed into and lock welded to the spider finger 48. An enlarged section 76 of the upper portion 64 forms a ledge 81 below the threaded portion 52 which can be welded to the interfacing bottom of the wall of the finger 48 to form the lock weld 80 to secure the end plug 40 from unscrewing from the connecting finger. The other end of the upper portion 64 has a socket 70 machined therein which is designed to mate with a ball stud 72 on the lower portion 68 of the upper end plug 40. The ball 72 and socket 70 are sized to leave a space 82 between the upper portion 64 and the lower portion 68 of the end plug extension 78 so that the control rods 34 can flex without placing a load on the walls of the fingers 48. This arrangement also enables the finger 48 to have a thicker bore wall portion at its lower end 56 which assists manufacture. The lower portion 68 of the end plug extension has the mating ball stud 72 at its upper end and a reduced diameter section at its other end for welding to the upper end of the control rod cladding tube. There are several methods for retaining the ball 72 within the socket 70. A retaining ring 84 seated in an annular groove within the socket 70 can be employed to retain the ball 72 within the socket as illustrated in FIG. 7. Alternatively, the bottom of the socket 86 may be crimped to provide the same function as illustrated in FIG. 6. Furthermore, a weld 88 can be formed at the bottom of the socket 70 as shown in FIG. 5 for this purpose.

The arrangement described and illustrated FIGS. 5-7 provides increased lateral deflection whose travel is limited by the interfacing in-reactor components instead of by the spider finger and enables thicker finger walls which improves the manufacturability of the rod cluster control assembly. With this arrangement, a weld can be used to lock the control rod to the bottom of the spider finger without having to drill holes for a pin.

While specific embodiments of the invention have been described in detail, it will be appreciated by those skilled in the art that various modifications and alternatives to those details could be developed in light of the overall teachings of the disclosure. Accordingly, the particular embodiments disclosed are meant to be illustrative only and not limiting as to the scope of the invention which is to be given the full breadth of the appended claims and any and all equivalents thereof.

What is claimed is:

1. A nuclear reactor control rod assembly comprising:
a drive shaft for moving the control rod assembly relative to a core of a nuclear reactor;
a control rod element connected to the drive shaft and insertable into the core of the nuclear reactor under a motive power of the drive shaft; and
a transition assembly connecting the drive shaft to the control rod element through a finger attachment, wherein at least a portion of a first end of the transition assembly fits within and is substantially rigidly connected to a wall of a bore in a bottom of the finger attachment and a portion of a second end of the transition assembly is configured to be an upper end plug of the control rod element and is affixed to an upper end of the control rod element and wherein a connection between the finger attachment and the control rod element is through a flexible joint coupling within the transition assembly that is between the first and second end and spaced a sufficient distance along a length of the transition assembly from and below the finger attachment and joins the first end to the second end of the transition assembly to enable lateral movement of the control rod element below the finger attachment which is not limited, by the finger attachment, and the control rod element does not place a lateral load on the rigid connection of the transition assembly to the bore that would add a strain to the connection between the first end and the wall of the bore in the finger attachment or cause substantial lateral movement of the first end within the bore, wherein the flexible joint coupling is a ball and socket coupling which enables the second end of the transition assembly and the control rod to rotate laterally.

2. The nuclear reactor control rod assembly of claim 1 wherein a bottom of the finger attachment is welded to an upper portion of the transition assembly.

3. The nuclear control rod assembly of claim 1 wherein the ball is captured within the socket with a retaining ring.

4. The nuclear control rod assembly of claim 1 wherein the ball is captured within the socket, with a weld, enabling the ball to rotate laterally in the socket.

5. The nuclear control rod assembly of claim 1 wherein a lower portion of the socket is crimped to capture the ball within the socket.

6. The nuclear control rod assembly of claim 1 wherein the portion of the first end of the transition assembly has a male thread that mates with a female thread within the bore of the finger attachment.

7. The nuclear control rod assembly of claim 6 wherein the first end has an enlarged shoulder below the male thread that abuts a lower end of the finger attachment.

8. The nuclear reactor control rod assembly of claim 7 wherein the lower end of the finger attachment is welded to the shoulder on the first end of the transition assembly.

9. The nuclear control rod assembly of claim 1 wherein the nuclear reactor includes one or more components that interface with the control rod element wherein the lateral movement of the control rod element is limited only by the interfacing component.

* * * * *